J. R. OSTOLAZA.
NON-SKID DEVICE AND EMERGENCY BRAKE.
APPLICATION FILED AUG. 21, 1917.
1,310,209.
Patented July 15, 1919.
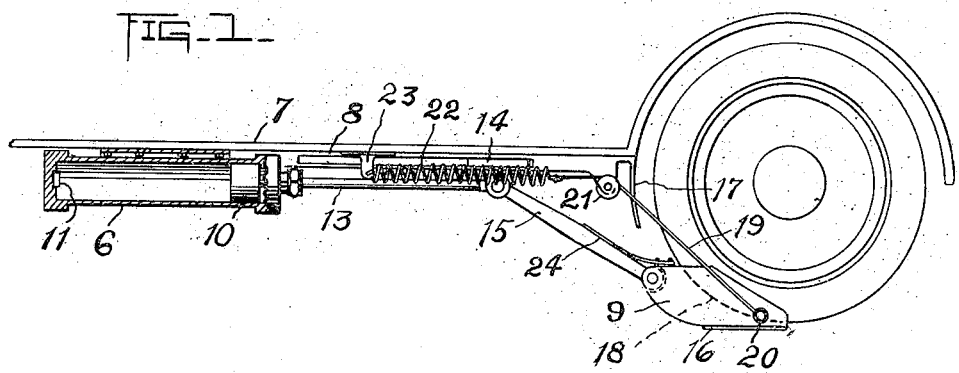
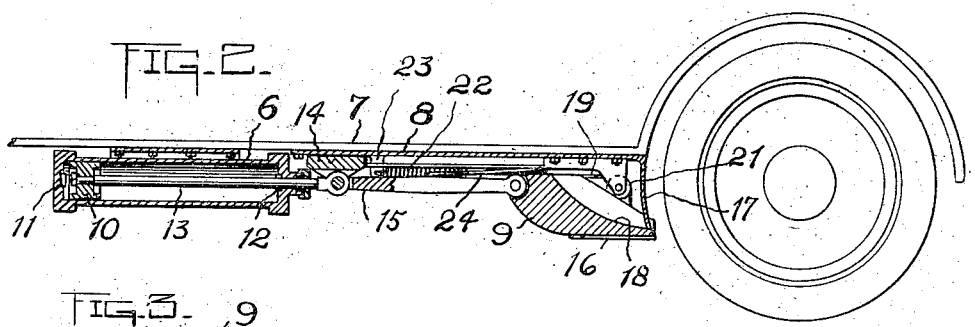
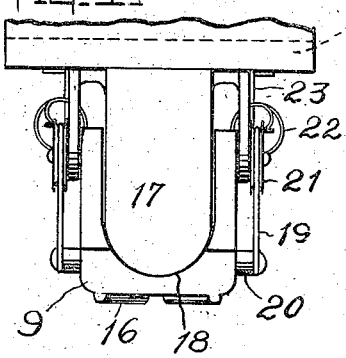
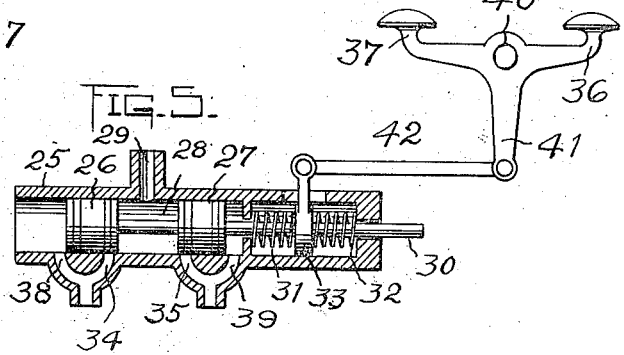
INVENTOR:
Justo Rivas Ostolaza.
By James W. Martin
His Attorney

UNITED STATES PATENT OFFICE.

JUSTO RIVAS OSTOLAZA, OF LOS ANGELES, CALIFORNIA.

NON-SKID DEVICE AND EMERGENCY-BRAKE.

1,310,209.　　　　　Specification of Letters Patent.　　Patented July 15, 1919.

Application filed August 21, 1917. Serial No. 187,488.

*To all whom it may concern:*

Be it known that I, JUSTO RIVAS OSTOLAZA, a subject of the King of Spain, and resident of Los Angeles, in the county of Los Angeles and State of California, have invented a new and useful Improvement in Non-Skid Devices and Emergency-Brakes, of which the following is a specification.

This invention relates to an improved emergency brake and non-skid device, and has for its object the provision of improved means for placing the device in operative position, and, also to provide a brake means that may be used and operated independently with reference to the ordinary service brakes.

Another object of the invention is to provide means for quick application of the brake to a vehicle, and to provide a brake means that may be lowered and brought between the ground and the tread of the wheels, and thus prevent the skidding of the vehicle, with the resultant wear on the tires, while at the same time the vehicle is brought to a stop.

Another object is to produce a brake means that is more efficient in use, and positive and automatic in action than emergency brakes of prior construction.

Further objects and advantages may appear from the following detail description.

In the drawings: Figure 1 is a side elevation of an emergency brake, embodying my invention, the brake and non-skid device being in operative position; Fig. 2 is a sectional detail view of the same; Fig. 3 is a top plan of the brake shoe; Fig. 4 is a rear elevation of the brake and non-skid device; together with a fragment of the motor vehicle foot-board to which it is attached; and Fig. 5 is a sectional detail of the valve and operative means for control of pressure to operate the brake.

Referring to the drawings: The essential features of this invention consist of a brake cylinder 6, rigidly attached to foot-board 7, of a motor vehicle, a crosshead guide 8, attached to the foot-board, a brake shoe 9, and suitable connecting means to actuate the brake shoe to operative and to inoperative position.

The piston 10, working within the cylinder, may be actuated by either compressed air or steam, admitted through ports 11, 12, in opposite ends of the cylinder. A piston rod 13 extends from piston 10 to crosshead 14, working in the crosshead guides. A connecting rod 15, has pivotal connection with the crosshead and shoe 9. The brake shoe is provided with non-skid ribs 16, divergent toward the rear to secure greater retardation when in contact with the ground.

The tongue 17 extends downward from the foot-board, and determines the position of the brake-shoe in the inoperative position, also serving to deflect the shoe downward as it moves to the operative position, and has a contour conforming with the tire groove 18 in the brake shoe, thereby preventing accumulation of foreign material thereon while in inoperative position.

Means to retain the brake shoe in inoperative position consist of cords 19, secured to lugs 20, on the shoe, and passing over pulleys 21; the cords having their opposite ends secured to spring coils 22, in turn secured to lugs 23, projecting from the foot-board. The spring coils and cords coöperate to retain the brake shoes in close proximity to the foot-boards in inoperative position. A spring 24, secured to the brake shoe, and bearing against rod 15, serves to maintain alinement thereof in inoperative position of the brake shoe.

In use, air or steam pressure may be admitted to either side of the piston to operate the brake and non-skid shoe. In Fig. 5 is shown a pressure or control valve, consisting of cylinder 25, having therein two pistons 26, 27, spaced apart to form a chamber 28, which is in constant communication with pressure inlet port 29. The pistons are mounted on rod 30, and are maintained in neutral position by opposed spring coils 31, 32, bearing against a buffer 33, fixed to rod 30. Service ports 34, 35, are respectively, in communication with ports 11, 12. To admit pressure to port 11, the pistons are shifted so that piston 26 will open port 34; the port remaining open so long as pedal 36 is depressed. This will cause the non-skid shoe to be thrown into operative position. By depressing pedal 37, the opposite pressure port 35 is placed in communication with the pressure chamber. The arrangement is such that as one pressure port is opened, the other will remain closed. On opening pressure port 34, the corresponding release port 38 is closed, and on opening pressure port 35, the corresponding release port 39 is closed. Pedals 36, 37, are fulcrumed on an intermediate pivot 40, and the rock-arm 41, integral with both pedals, is connected by a link 42, to buffer 33.

To operate the brake, the pedal 36 is depressed by the operator, thereby admitting pressure to the cylinder 6 which serves to shift the brake shoe to operative position beneath the automobile wheel. To release the brake shoe, the opposite pedal is depressed, thereby admitting pressure to the opposite end of the cylinder, which serves to retract the brake shoe to inoperative position.

From the foregoing it may be seen that I have constructed a simple and efficient non-skid apparatus for motor vehicles, that may be readily brought into operation with the depression of a foot lever. As various sources of pressure for the operation of this device may be employed, I have not illustrated the same. The application of this device is practically instantaneous, and the two-fold function performed thereby, will diminish and prevent accidents, and avoid wear detrimental to the tires.

What is claimed is:

1. The combination with a rear wheel and foot-board of an automobile, of a cylinder beneath the foot-board, a piston working within the cylinder, a crosshead guide, a crosshead working on the guide, a connecting rod between the crosshead and piston, a bar pivotally connected to the crosshead, a brake shoe pivotally connected to the bar, and arranged in proximity to the rear wheel, said brake shoe being provided with a curved and inclined tire groove, a tongue depending from the foot-board and engaging with said groove to deflect the shoe upon initial movement to operative position, and means for admitting fluid pressure to the cylinder to actuate the piston therein.

2. The combination with the foot board of an automobile, of a cylinder beneath the foot board, a piston working therein, a crosshead guide beneath the foot board, a cross head working thereon, a piston rod connecting the piston and crosshead, a bar pivoted at one end to the crosshead, a brake shoe having a groove to receive an automobile wheel in the operative position, means for admitting fluid pressure to the cylinder to actuate the brake shoe, a deflector depending from the foot-board and engaging with the groove in the brake shoe during its initial movement to operative position, a leaf spring fixed to the shoe and serving to maintain the shoe in alinement with the operating bar, and spring and cord elements to retain the shoe in inoperative position.

3. In a non-skid device, the combination with the rear wheels and foot-board of a motor vehicle, of a cylinder beneath the foot-board, a reciprocating piston therein, a piston rod extending therefrom, a crosshead actuated by the piston and piston rod, a brake-shoe, a connecting rod between the crosshead and brake shoe, and means to admit a fluid medium pressure to the cylinder and thereby actuate the brake shoe to non-skid position.

4. In a non-skid device, the combination with the rear wheels and foot-board of a motor vehicle, of a cylinder beneath the foot-board, a crosshead guide, a crosshead working on the guide, a piston working within the cylinder, a piston rod connecting the piston and crosshead, a bar pivoted to the crosshead, a brake shoe pivoted to the bar and adapted to contact with the ground, and means for admitting a fluid medium pressure to the cylinder.

In testimony whereof, I hereunto affix my signature, this 16th day of August, 1917.

JUSTO RIVAS OSTOLAZA.

Witnesses:
    J. A. BERNAL,
    FREDERIC M. KEENEY.